G. J. HELY.
TRAY STACKING APPLIANCE.
APPLICATION FILED JUNE 26, 1917.

1,267,869.

Patented May 28, 1918.
2 SHEETS—SHEET 1.

Inventor
G. J. Hely
By
Attorneys

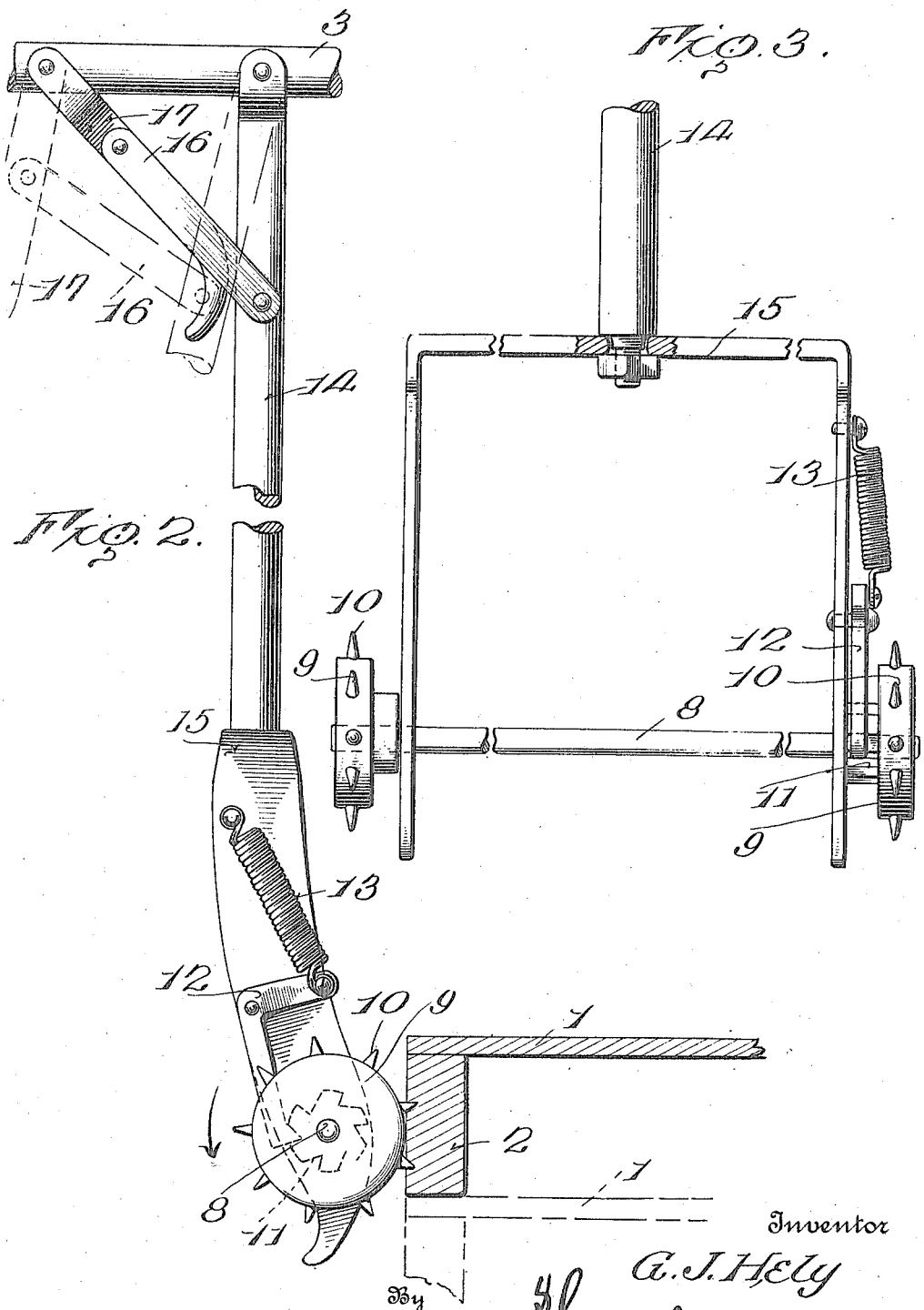

UNITED STATES PATENT OFFICE.

GUY J. HELY, OF FRESNO, CALIFORNIA.

TRAY-STACKING APPLIANCE.

1,267,869.         Specification of Letters Patent.     Patented May 28, 1918.

Application filed June 26, 1917. Serial No. 177,056.

*To all whom it may concern:*

Be it known that I, GUY J. HELY, a citizen of the United States, residing at Fresno, in the county of Fresno and State of California, have invented certain new and useful Improvements in Tray-Stacking Appliances, of which the following is a specification.

This invention is a device for use in stacking trays employed in curing raisins. Raisins are now set out to dry upon trays consisting of light thin boards secured at their ends to and supported by cross bars of wood, and after the raisins have been dried or upon approach of a storm it is the practice to pile the trays so that the piled trays may be covered and the fruit protected. The work of piling the trays manually is laborious and time-consuming, and to facilitate the operation I have devised the appliance illustrated in the accompanying drawings and hereinafter fully described by the the use of which the work may be very expeditiously performed. The invention consists in certain novel features which will be particularly pointed out in the claims following the detailed description.

In the drawings:

Fig. 2 is an enlarged side elevation of one side or member of the apparatus;

Fig. 3 is an end elevation of a portion of the apparatus.

Figure 1:
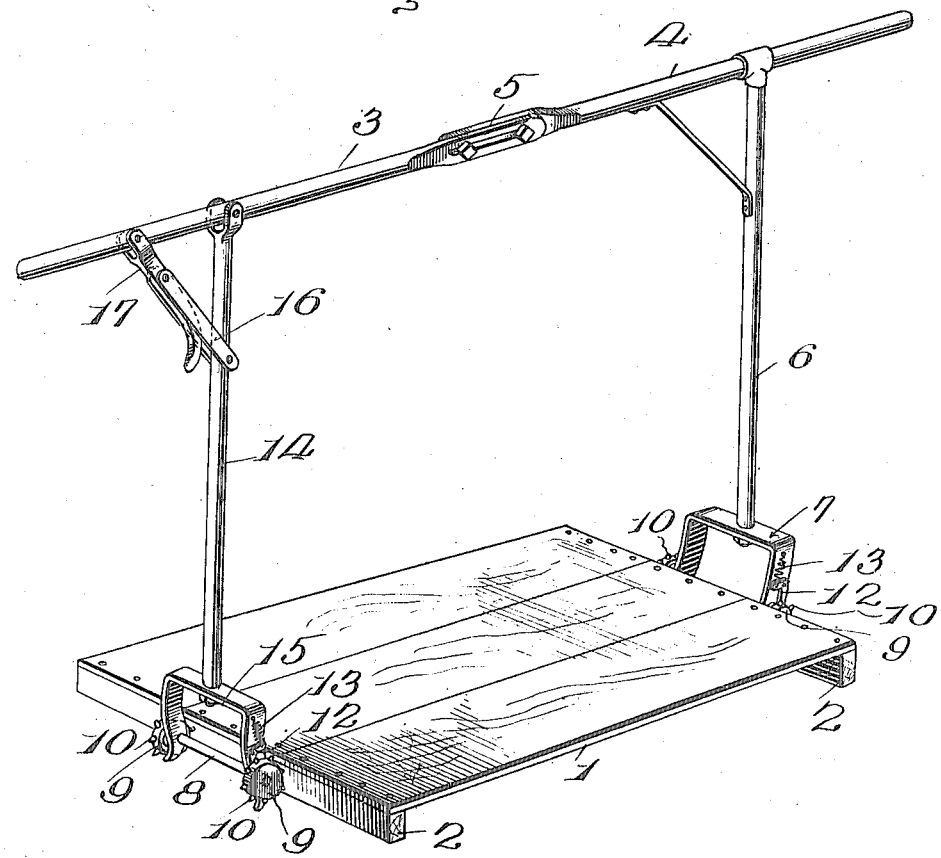
Figure 1 is a perspective view showing my appliance in its operative position as supporting a tray which is to be carried to and placed upon another tray.

The tray consists, as previously stated, of thin boards 1 secured at their ends to cross bars 2 which are generally of wood and may be readily penetrated by teeth or spurs. The raisins are spread upon the upper surface of the boards 1 and so distributed that the surface of the boards immediately over the cross bars 2 will be uncovered and may receive the lower edges of the cross bars upon a superposed tray as is shown in Fig. 2.

In carrying out my invention, I employ a handle bar which is preferably formed in two sections 3 and 4 adjustably connected in any preferred manner at their inner ends 5 so that the device may be adjusted to trays of different sizes. To the section 4 of the handle bar, I secure a standard 6 having a yoke 7 swiveled to its lower end. This yoke 7 has a shaft 8 journaled in the lower ends of its side members and to the ends of said shaft beyond the side members, I secure the wheels or disks 9 each having a plurality of spurs or teeth 10 radiating from its circumference. These spurs or teeth 10 are of such dimensions that they may readily engage without destroying the side bars 2 and they will be of conoidal or sharpened form so that they will readily penetrate the wood forming the cross bar, as clearly shown in Fig. 2. In order to prevent the weight of the tray rotating the wheels in such direction as to permit the tray to drop, I provide, between one of the disks or wheels and the adjacent side member of the yoke, a ratchet disk or stop member 11 and upon said side member, above the said stop member, I pivotally mount a dog or pawl 12 which is held in engagement with the teeth of the ratchet or stop member 11 by a spring 13 having its opposite ends secured to the end of the dog and to the side member of the yoke, as clearly shown. As shown most clearly by dotted lines in Fig. 2, it will be readily understood that rotation of the wheel or disk in the direction indicated by the arrow will be permitted but rotation in the opposite direction will be prevented.

To the handle member 3, I attach a standard, hanger or supporting member 14 which is similar in all respects to the standard, hanger or supporting member 6 except that the upper end of the member 14 is pivoted to the handle member 3 instead of being rigidly secured thereto. To the lower end of the hanger 14, I swivel a yoke 15 which is identical in construction with the yoke 7 and carries duplicates of the wheels 9, a dog 12, and the coacting parts. A toggle, consisting of the links 16 and a lever or handle member 17, connects the hanger 14 with the handle member 3 beyond the point of pivotal connection between the handle member and the hanger, as shown clearly in Figs. 1 and 2. The lower ends of the links 16 are pivoted to the hanger and the upper ends of said links are pivoted to the opposite sides of the lever 17 which has its upper extremity pivoted to the handle member 3, as clearly shown. When the lever and the link members of the toggle are in alinement, the hanger 14 will be held against the edge of the tray and the teeth 10 of the disks or wheels 9 at opposite sides of the tray will be forced into engagement with the cross bars 2 so as to support the tray. If the toggle be collapsed, as indicated by dotted lines in Fig. 2, the hanger will be swung away from the tray and consequently the tray will be released. While I prefer the toggle arrangement, I do not limit myself to such mechanism and other means may be employed for manipulating the hanger 14.

The use of the device will, it is thought, be readily understood. When a tray is to be moved, the hangers 6 and 14 are disposed at opposite sides of the same and the toggle is straightened thereby swinging the hanger 14 toward the tray and forcing the teeth 10 of all the disks or wheels 9 into positive engagement with the respectively adjacent cross bars 2. The tray can then be lifted and deposited upon a second tray, after which if a slight downward pressure be exerted through the handle members, the disks or wheels 9 will be caused to rotate and ride down the cross bars and edges of the trays so as to engage the cross bars of the lower tray. The two superposed trays can then be lifted and placed upon a third tray and the operation repeated until the entire space between the handle members and the hangers is filled with trays, whereupon the pile of trays may be placed in a store house or otherwise protected against bad weather or other deteriorating influences. To release the appliance from the pile of trays, it is necessary merely to fold the toggle by pulling outwardly upon the lower end of the lever member 17 of the same, whereupon the hanger 14 will be swung outwardly, as indicated by dotted lines in Fig. 2. Another pile of trays can then be collected and the operation repeated until all of the trays have been collected and stored.

It will be readily noted that my device is exceedingly simple and may be manipulated by two men so that a very large number of trays may be stored expeditiously and a very pronounced saving of time effected over the present methods. When the device is being carried from place to place with a pile of trays therein, the dropping of the trays is positively prevented by the engagement of the teeth or spurs 9 with the bars 2 of the lowermost tray. The weight of the tray tends to rotate the rollers or disks 9 in a direction opposite to that indicated by the arrow in Fig. 2, but this rotation is prevented by the dog 12 engaging the ratchet 11. By collapsing or folding the toggle, however, the device may be instantly removed from the trays. The swiveled connection of the yokes 7 and 15 to the respective hangers permits the said yokes to automatically assume a position parallel with the ends or sides of the tray so that when the toggle is straightened, the pressure exerted will be distributed evenly through all the rollers or disks and the tray, consequently, supported in a well balanced manner so that the tipping of the same and loss of fruit will be avoided.

Having thus described the invention, what is claimed as new is:

1. A device for the purpose set forth comprising a handle member, a hanger rigidly secured at its upper end to the handle member, a coöperating hanger pivotally suspended at its upper end from the handle member, and a toggle connected at its lower end to the last-mentioned hanger and at its upper end to the handle member between the hanger and the adjacent end of the handle.

2. A device for the purpose set forth comprising a handle member, hangers suspended from the handle member, yokes swiveled upon the lower ends of the hangers, and tray-engaging devices carried by the lower ends of said yokes.

3. A device for the purpose set forth comprising a handle member, hangers suspended from said handle member, yokes swiveled on the ends of the hangers, shafts journaled in the lower ends of the yokes, disks on the ends of the shafts provided with teeth adapted to penetrate the ends of a tray, ratchets on said shafts, dogs on the yokes adapted to engage said ratchets, and yieldable means for holding the dogs in engagement with the ratchets.

In testimony whereof I affix my signature.

GUY J. HELY. [L. S.]

Copies of this patent may be obtained for five cents each, by addressing the "Commissioner of Patents, Washington, D. C."